United States Patent
Snider et al.

(10) Patent No.: US 7,210,880 B2
(45) Date of Patent: May 1, 2007

(54) LOCK SET INSTALLATION APPARATUS AND KIT AND METHOD OF USING THE SAME

(75) Inventors: Gregory S. Snider, Bel Air, MD (US); James E. Pangerc, Baltimore, MD (US)

(73) Assignee: Black & Decker Inc., Newark, DE (US)

( * ) Notice: Subject to any disclaimer, the term of this patent is extended or adjusted under 35 U.S.C. 154(b) by 431 days.

(21) Appl. No.: 10/712,862

(22) Filed: Nov. 13, 2003

(65) Prior Publication Data

US 2005/0105979 A1    May 19, 2005

(51) Int. Cl.
  *B23B 49/02* (2006.01)
  *B23B 47/28* (2006.01)
(52) U.S. Cl. .................... 408/115 R; 408/103
(58) Field of Classification Search ........... 408/72 B, 408/115 B, 103, 115 R, 241 B
  See application file for complete search history.

(56) References Cited

U.S. PATENT DOCUMENTS

| | | | | |
|---|---|---|---|---|
| 597,915 A | * | 1/1898 | Roosa .......................... 33/675 |
| 2,522,400 A | * | 9/1950 | Polkosnik .................. 408/104 |
| 2,599,819 A | * | 6/1952 | Fisher ......................... 33/675 |
| 2,763,299 A | | 9/1956 | Cerf, Jr. |
| 2,842,860 A | * | 7/1958 | Gray ............................ 33/667 |
| 2,843,167 A | * | 7/1958 | Rushton ...................... 144/76 |
| 3,026,748 A | * | 3/1962 | Comorau ..................... 408/91 |
| 3,169,788 A | * | 2/1965 | Slan ........................... 292/177 |
| 3,212,366 A | * | 10/1965 | Russell et al. ................ 408/97 |
| 3,302,674 A | * | 2/1967 | Russell et al. ........... 408/241 G |
| 3,345,755 A | * | 10/1967 | Ferebee ....................... 33/675 |
| 3,583,823 A | * | 6/1971 | Eaton et al. ............. 408/115 R |
| 3,635,571 A | | 1/1972 | Roberts et al. |
| 3,700,344 A | * | 10/1972 | Grumbach .................. 408/108 |
| 3,973,860 A | | 8/1976 | Kern |
| 4,130,930 A | * | 12/1978 | Webster ....................... 29/466 |
| 4,248,554 A | | 2/1981 | Boucher et al. |
| 4,320,831 A | * | 3/1982 | Szabo et al. ................ 206/45.2 |
| 4,791,732 A | * | 12/1988 | Bruno et al. ................... 33/578 |
| 4,981,400 A | | 1/1991 | Stover |
| 5,062,747 A | * | 11/1991 | Chen ...................... 408/115 R |
| 5,222,845 A | | 6/1993 | Goldstein et al. |
| 5,242,368 A | * | 9/1993 | Buckley et al. ............. 493/421 |
| 6,390,738 B1 | | 5/2002 | Fridman |
| 6,398,465 B1 | | 6/2002 | Monge |
| 6,607,221 B1 | * | 8/2003 | Elliott ......................... 292/33 |
| 6,910,837 B2 | * | 6/2005 | Trettin et al. ........... 408/115 B |

(Continued)

OTHER PUBLICATIONS

Photograph of Black & Decker Metal/Wood Cutting Bi-Metal Door Lock Installation Kit, undated.

*Primary Examiner*—Daniel W. Howell
*Assistant Examiner*—Sara Addisu
(74) *Attorney, Agent, or Firm*—Harness, Dickey & Pierce, P.L.C.

(57) ABSTRACT

A lock set installation apparatus has a pair of hole saw guides which locate a hole to receive door operating members of a lock set. Each hole saw guide has at least one rail member which oppose one another. A lock bolt hole mechanism is movable and coupled with the rails. The lock bolt hole mechanism centers the lock bolt hole onto the door. A locking mechanism locks the hole saw guides with respect to one another to enable cutting of the door.

12 Claims, 6 Drawing Sheets

U.S. PATENT DOCUMENTS 7,004,515 B2 * 2/2006 Timothy ..................... 292/137
D516,401 S * 3/2006 Snider et al. .................. D8/71
7,073,991 B2 * 7/2006 Thomas .................. 408/115 R
2004/0165339 A1 * 8/2004 Nakajima et al. ........... 361/600

* cited by examiner

LOCK SET INSTALLATION APPARATUS AND KIT AND METHOD OF USING THE SAME

FIELD OF THE INVENTION

The present invention relates to lock set installation and, more particularly, to an apparatus or jig to provide proper alignment to bore holes in a door to install a lock set assembly.

Installation jigs to install lock sets are known in the art. Examples of such jigs are illustrated in U.S. Pat. No. 6,398,465 to Monge and U.S. Pat. No. 2,763,299 to Cerf. The Monge patent illustrates an installation jig which includes a pair of jaws and a latch guide coupled together by an adjusting mechanism. The latch guide is somewhat complicated, however, it appears to work satisfactory for its intended purpose. The patent to Cerf illustrates a lock installation tool which only provides for a single back set. While these patents provide satisfactory apparatus, designers are always striving to improve the art.

The present invention provides the art with a simple lock set installation jig which is easily adjustable to fit onto a door. The jig enables receipt of both standard types of lock sets. The invention has a drive mechanism to tighten the apparatus onto a door. Also, the apparatus includes a lock mechanism to lock the apparatus in position on the door after it has been tightened onto the door.

According to a first aspect of the invention, a lock set installation apparatus comprises a pair of hole saw receiving members to locate door operating members of a lock set on a door. At least one of the pair of hole saw receiving members includes a hole saw receiving aperture and each includes at least one rail member. The rail members of the pair of hole saw receiving members oppose one another. A bolt lock hole mechanism is coupled with the opposing rail members. The opposing rail member enables the pair of hole saw members to move towards and away from one another. The bolt lock hole mechanism includes an aperture to position a drill to form a hole for a lock bolt assembly. A locking mechanism locks the pair of members in position with respect to one another to enable boring of a door. The locking mechanism is coupled with at least one of the rail members. Each of the rail members includes a plurality of gear teeth. The bolt lock mechanism has a ring gear with a plurality of gear teeth which mesh with the gear teeth of the rails. The locking mechanism includes a ring gear with a plurality of ratchet teeth on one of the rails. A ratchet arm, having ratchet teeth, is coupled with the rail ratchet teeth to lock the members with respect to one another. Also, a slide latch secures the ratchet arm in position on the rail to enhance the lock. Ordinarily, the members include a pair of rails.

In accordance with a second aspect of the invention, a door lock set installation kit comprises a hole saw, a drill bit and a jig. The jig is comprised of a pair of hole saw receiving members to locate the door operating members of a lock set on a door. At least one of the pair of hole saw receiving members includes a hole saw receiving aperture and each includes at least one rail member. The rail members of the pair of hole saw receiving members oppose one another. A bolt lock hole mechanism is coupled with the opposing rail members. The opposing rail members enable the pair of hole saw receiving members to move towards and away from one another. The bolt lock hole mechanism includes an aperture to position a drill to form a hole for a lock bolt assembly. A locking mechanism locks the pair of hole saw receiving members in position with respect to one another to enable boring of a door. The locking mechanism is coupled with at least one of the rail members. Each of the rail members includes a plurality of gear teeth. The bolt lock hole mechanism has a ring gear with a plurality of gear teeth which mesh with the gear teeth of the rails. The locking mechanism has a plurality of ratchet teeth on one of the rails. A ratchet arm, with ratchet teeth, is coupled with the rail ratchet teeth to lock the members with respect to one another. Also, a slide latch member secures the ratchet arm in position on the rail to enhance the lock. Ordinarily, the hole saw receiving members include a pair of rails.

According to a third aspect Of the invention, a method for installing a lock set comprises positioning the jig on the door. The jig is tightened onto the door. A hole saw is positioned in the hole saw receiving member aperture. The door is cut by the hole saw. A drill bit is positioned into the lock bolt hole mechanism. A hole is bored into the door by the drill bit. A lock set is assembled onto the door utilizing the drilled holes. Further, the lock bolt hole mechanism is adjusted to clamp the members onto the doors. Once the adjustment is proper, the rails and, in turn, the hole saw receiving members are locked with respect to one another.

From the following detailed description taken in conjunction with the drawings and subjoined claims, other objects and advantages of the present invention will become apparent to those skilled in the art.

DETAILED DESCRIPTION OF THE PREFERRED EMBODIMENTS

Figure 1:
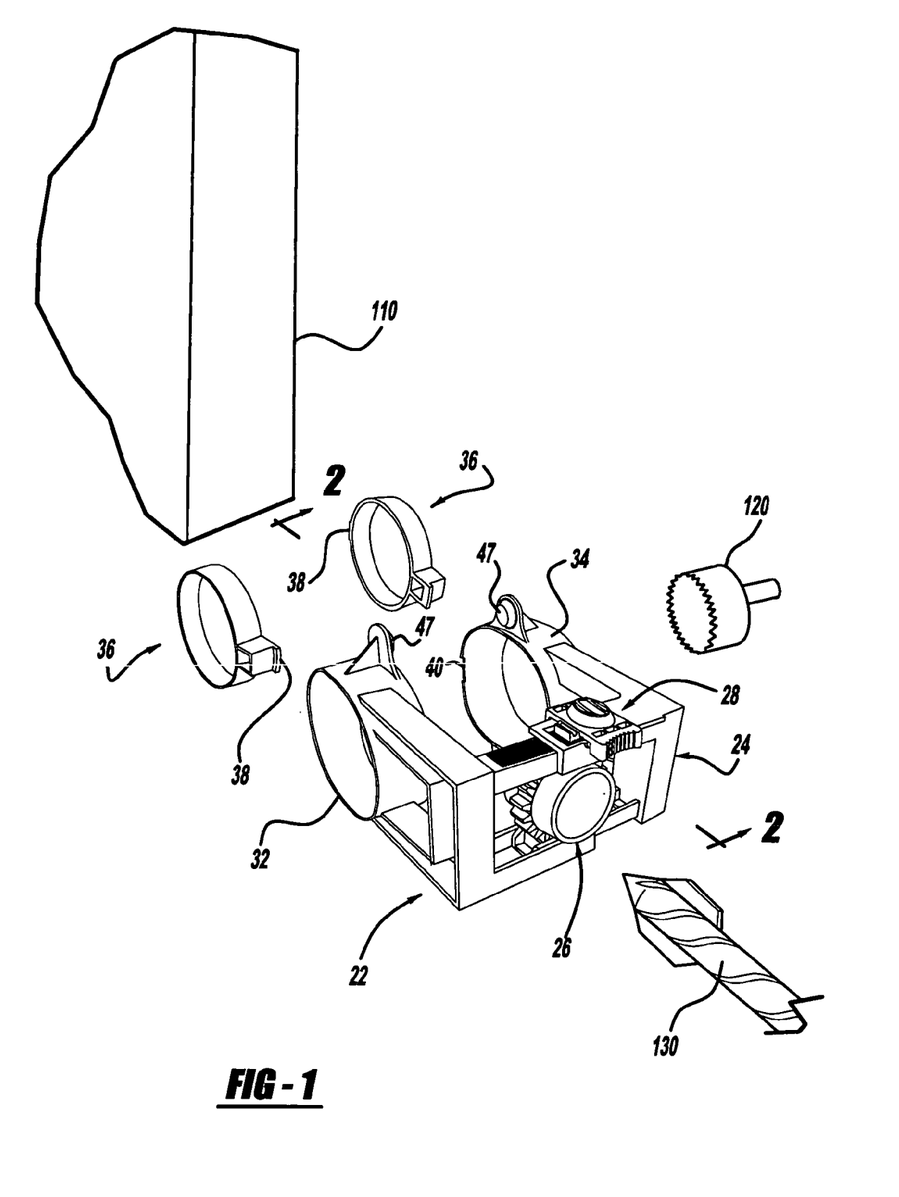
FIG. 1 is a perspective view of a lock set installation apparatus in accordance with the present invention.

Turning to the Figures, particularly FIG. 1, a lock set installation apparatus is illustrated and designated with the reference numeral 20. The installation apparatus 20 includes a pair of hole saw guides 22 and 24. The pair of hole saw guides 22 and 24 are coupled with one another. A lock bolt hole mechanism 26 is coupled with the hole saw guides to enhance movement of the hole saw guide members 22 and 24 towards and away from one another. Also, a locking mechanism 28 is coupled with the hole saw guides 22 and 24 to lock the guides in position on a door.

The hole saw guide members 22 and 24 are similar to one another being mirror images of each other. Both include an annulus 32 and 34 to receive a hole saw. However, only one annulus is needed and the other could be a blank. The annulus 32 and 34 has an overall oblong elliptical design providing guide surfaces 33, 35 for both of the standard lock back sets. Also, a guide ring 36 can be positioned into the annulus to provide a small guide hole for the hole saw. The guide rings 36 include projections 38 which fit into recesses 40 on the annulus 32 and 34. Beams 42 and 44 project from annuli 32 and 34, respectively. The beams 42 and 44 include pressure pads 43, 45. The pressure pads 43, 45 include an elastomeric tab 47 which enhances retention of the apparatus 20 on a door. The annuli 32 and 34 also include elastomeric tabs 47 to enhance retention. The beams include rails 46 and 48 and 50 and 52.

Figure 2:
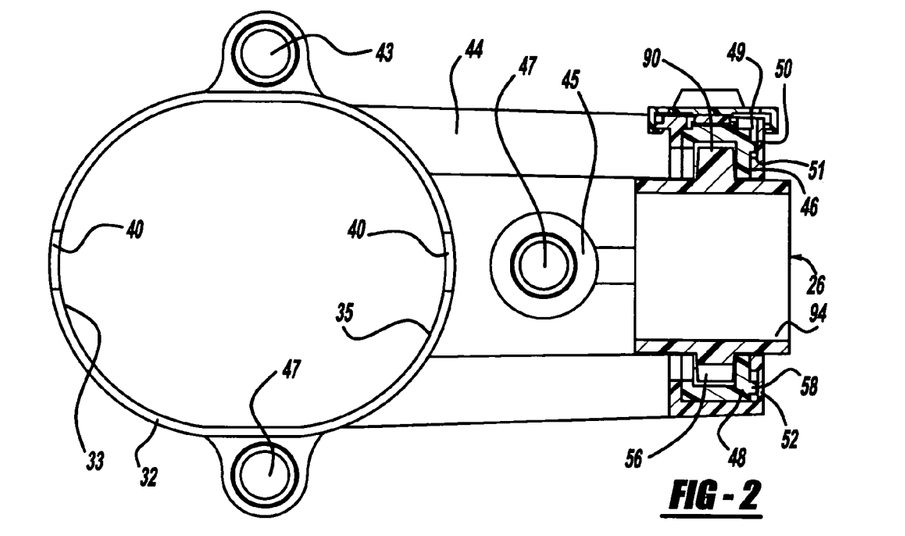
FIG. 2 is a cross section view of FIG. 1 along line 2—2 thereof.
Figure 3:
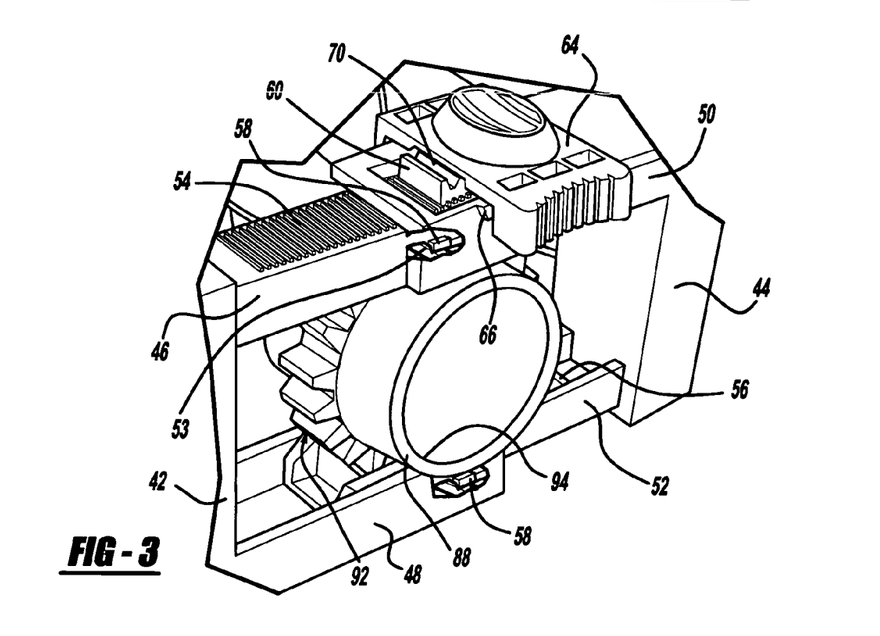
FIG. 3 is a front perspective view of the installation apparatus of FIG. 1.

The rails 46 through 52 have an overall U-shape in cross-section with rails 46 and 52 having a smaller web to fit into the U of rails 48 and 50, respectively, as seen in FIGS. 2 and 3. This enables the hole saw guides 22, 24 to move with respect to one another. The rails 46 and 52 are substantially identical. The rails 46 and 52 include an outer surface having a plurality of unidirectional ratchet teeth 54. The inner surface of the rails 46 and 52 include teeth 56 which act as a rack as will be described herein. Also, the rails 46 and 52 include a stop 58 which is positioned inside of the rails 48 and 50. The stops 58 prohibit further extension of the hole saw guide members 22 and 24 with respect to one another. The stops 58 also prohibit the hole saw guides 24 from coming apart from one another.

Rail 48 has a recess 49 with a flange 51 to receive the stop 58 on rail 52. The stop 58 slides on the flange until it contacts the end 53 of the recess 49 where movement is stopped. This happens on both sides of the flange 51 to prohibit further movement in both directions. Also, the rails 48 and 50 contact the frame 42 and 44 to prohibit further movement of the hole saw guides 22 and 24 toward one another as seen in FIG. 3.

Figure 6:
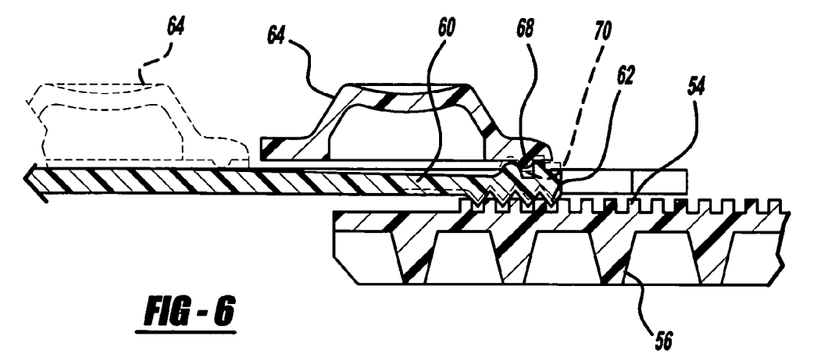
FIG. 6 is a cross section view of FIG. 3 along line 6—6 thereof.

The rail 50 includes a recess 49 and flange 51 like that previously described. Also, the rail 50 includes a ratchet arm 60 which includes ratchet teeth 62. Ratchet teeth 62 contact ratchet teeth 54 to lock the hole saw guides 22 and 24 in position with respect to one another, see FIG. 6. A sliding latch 64 is positioned on rails 66 and 68 on rail 50. The sliding latch 64 forces the ratchet arm 60 downward, which, in turn, meshes teeth 54 and 62 together. The sliding latch 64 includes a flange 66 to seat in the ratchet arm recess 70 to secure and lock the rails together.

Figure 4:
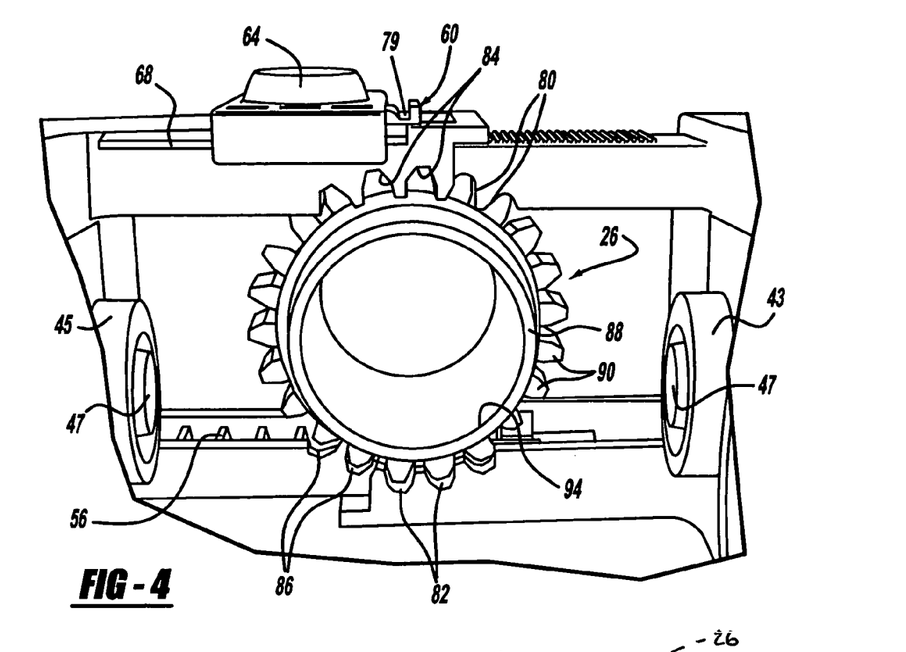
FIG. 4 is a rear perspective view of the installation device of FIG. 1.
Figure 5:
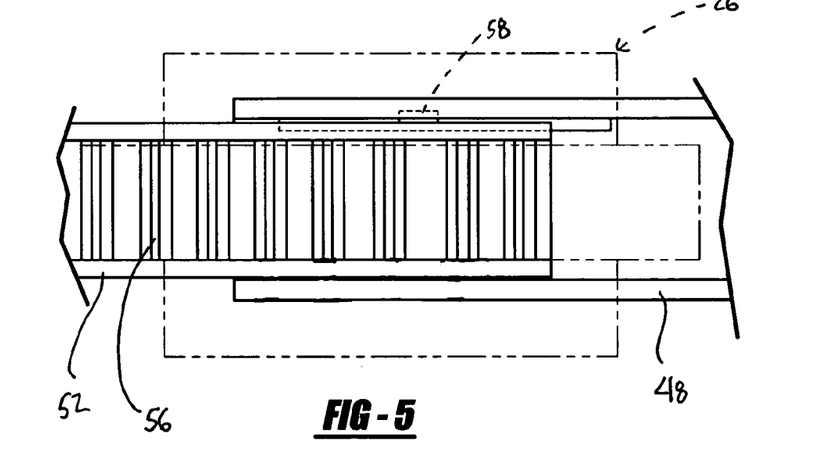
FIG. 5 is a cross section view of FIG. 3 along line 5—5 thereof with the lock bolt hole mechanism in phantom.

The rails 46, 48, 50 and 52 include tooth cut outs 80, 82, 84 and 86 on a leg of the U. This is best illustrated in FIG. 4. The cutouts 80 through 86 are positioned with respect to one another to receive the lock bolt hole mechanism 26. The lock bolt hole mechanism 26 is centered with respect to the hole saw guides 22 and 24, when the lock bolt hole mechanism 26 is positioned onto the rails 46 through 52. The lock bolt mechanism 26 has a cylindrical annulus 88 with gear teeth 90 positioned on its outer surface forming a gear ring 92. The gear ring 92 fits into the gear teeth 56 so that as the rails 46–56 are moved with respect to one another, the bolt hole member 26 free floatingly rotates in the rails 46–52 acting as a pinion. There is a bore 94 in the cylindrical annulus 88 to enable a drill bit to pass through the bolt lock hole mechanism 26 to drill the door for a lock bolt.

Figure 7:
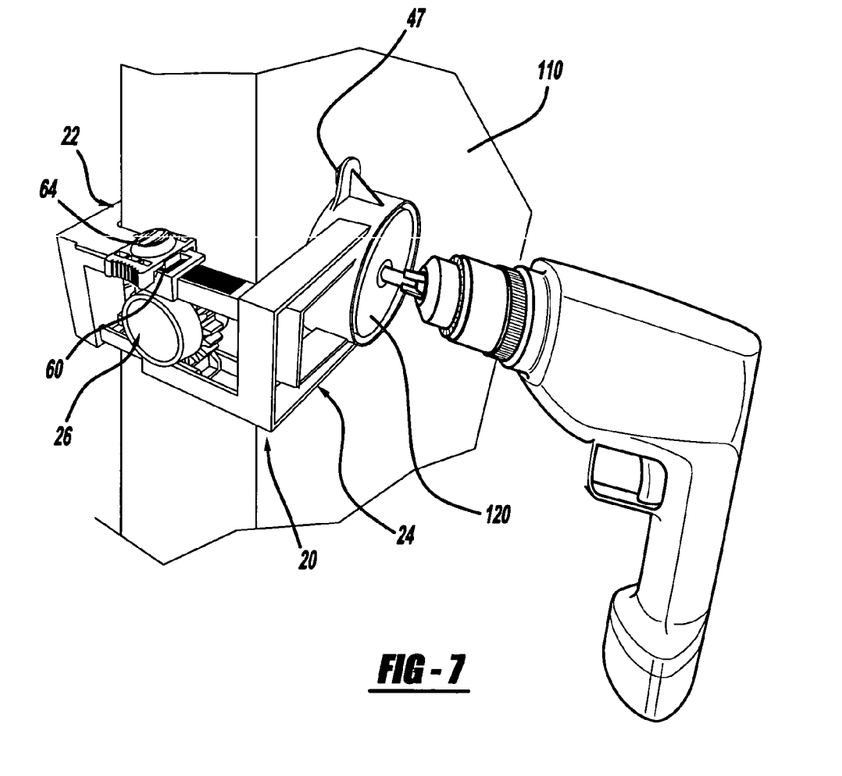
FIG. 7 is a perspective view of the installation apparatus on a door ready for use.
Figures 8, 9:
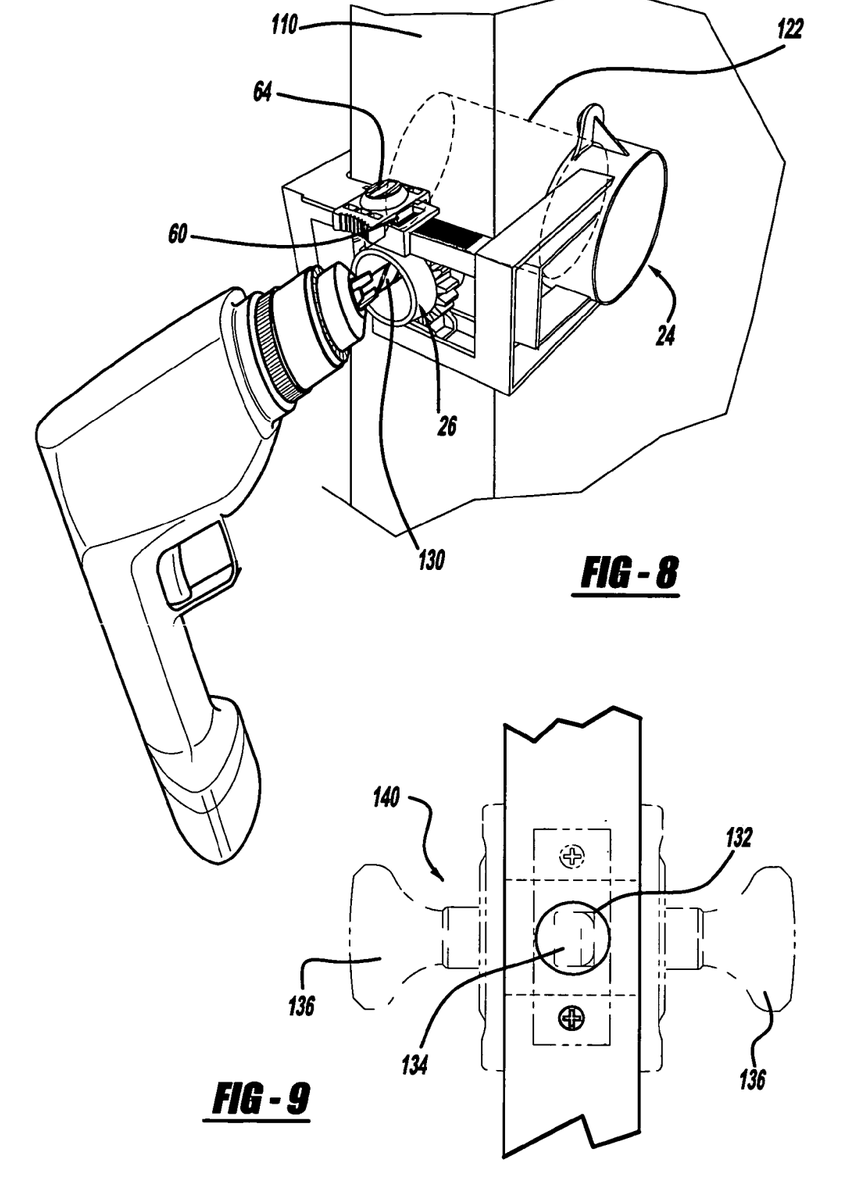
FIG. 8 is a front perspective view of the apparatus on the door.
FIG. 9 is a perspective view of the door with its holes with a lock set in phantom.

Turning to FIGS. 7 through 9, the apparatus is illustrated on a door 110. First, the apparatus 20 is opened so that the gap between the hole saw guide members 22 and 24 is large enough to receive the door 110. Once the door 110 is positioned between the gap, the hole saw guide members 22 and 24 are squeezed to move towards one another. As the hole saw guides 22 and 24 are squeezed together, the tabs 47 contact the door 110. The tabs 47 temporarily secure the hole saw guides 22, 24 on the door 110. The latch 64 is slid on top of the ratchet arm 60 to lock the hole saw guides 22, 24 with respect to one another. As the latch 64 is slid, its flange 68 comes in contact with the ratchet arm recess 70 which, in turn, forces the ratchet arm 60 downward which engages the ratchet arm teeth 66 with the teeth 54 of the rail 46.

After the apparatus 20 is secured on the door, the hole saw 120 is inserted into an aperture in either of the annulus 32, 34 and a hole 122 is drilled into the door 110. The hole can be drilled from one side or both sides depending on the workman's desires or product configuration. After the hole 122, via the hole saw, is drilled into the door 110, a drill bit 130 is positioned into the bore 94 in the bolt lock hole mechanism 26. Since the bolt lock hole mechanism 26 is already centered on the door 110, no adjustment is necessary. The drill bit 130 bores into the door 110 forming a bore 132 in the door which intersects the hole 122 which was made by the hole saw. Once these holes 122, 132 are completed, the bolt mechanism 134, as well as the operator mechanisms 136, are inserted through the holes 122, 132 to complete the assembly of the lock set 140 onto the door.

Figure 10:
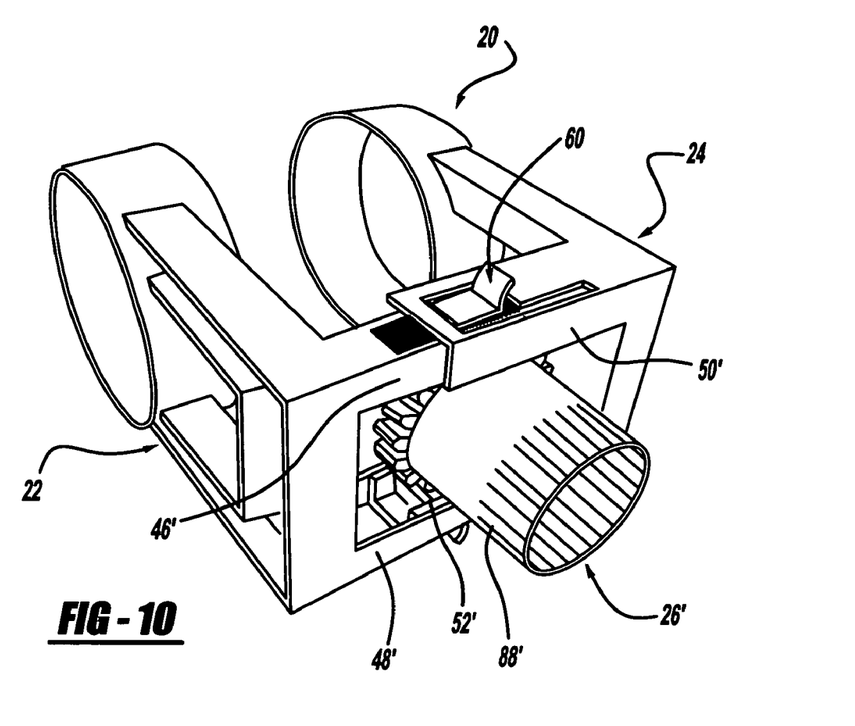
FIG. 10 is a second embodiment of the present invention.

Turning to FIG. 10, an additional embodiment is illustrated. In FIG. 10, the design is substantially the same as that previously disclosed. However, rails 48' and 50' may both include a ratchet arm 60 as described above. The ratchet arms 60 may include latch members (not shown) to secure them in place.

Also, the bolt lock hole mechanism 26' or pinion may be modified to include a longer annulus 88' which acts as a knob which can be rotated to move the hole saw guides 22, 24 towards and way from one another.

The remainder of the apparatus is the same as that previously discussed.

In light of the above detailed description, those skilled in the art will appreciate that variations, modifications or alteration may occur without deviating from the scope and spirit of the present invention.

What is claimed is:

1. A lock set installation apparatus comprising:
   a pair of hole saw guides for locating holes to receive door operating members of a lock set, at least one hole saw guide of said pair of hole saw guides including a hole saw receiving aperture and each including at least one rail said at least one rail opposing one another;
   a bolt lock hole mechanism coupled with said at least one opposing rail, said opposing rails coupled together for enabling said pair of hole saw guides to move toward and away from one another, said bolt lock mechanism including an aperture for positioning a drill to form a hole for a lock bolt assembly, said bolt lock mechanism including a mechanism for centering said bolt lock mechanism with respect to said pair of hole saw guides during movement of said rails;
   a locking mechanism for locking said pair of hole saw guides in position with respect to one another to enable cutting of a door, said locking mechanism coupled with at least one of said rails.

2. The lock set installation apparatus according to claim 1, wherein each said at least one rail includes a plurality of gear teeth.

3. The lock set installation apparatus according to claim 2, wherein said bolt lock hole mechanism has a ring gear with a plurality of gear teeth meshing with said gear teeth of said rail for enabling centering of said bolt lock hole mechanism.

4. The lock set installation apparatus according to claim 1, wherein said locking mechanism comprising a plurality of ratchet teeth on one of said at least one rails and a ratchet arm coupled with said ratchet teeth for positioning said members with respect to one another.

5. The lock set installation apparatus according to claim 4 further including a latch securing said ratchet arm in position on said rail for locking said hole saw guides with respect to one another.

6. The lock set installation apparatus according to claim 1, wherein each hole saw guide includes a pair of rails.

7. A door lock set installation kit comprising:
   a hole saw;
   a drill bit; and
   a jig comprising a pair of hole saw guides for locating holes to receive door operating members of a lock set, at least one of said pair of hole saw guides including a hole saw receiving aperture and each including at least one rail said at least one rail opposing one another;
   a bolt lock hole mechanism coupled with said at least one opposing rail, said opposing rails coupled together for enabling said pair of hole saw guides to move toward and away from one another, said bolt lock mechanism including an aperture for positioning a drill to form a hole for a lock bolt assembly, said bolt lock mechanism including a mechanism for centering said bolt lock mechanism with respect to said pair of hole saw guides during movement of said rails;
   a locking mechanism for locking said pair of hole saw guides in position with respect to one another to enable cutting of a door, said locking mechanism coupled with at least one of said rails.

8. The door lock set installation kit according to claim 7, wherein each said at least one rail includes a plurality of gear teeth.

9. The door lock set installation kit according to claim 8, wherein said lock bolt hole mechanism has a gear ring with a plurality of gear teeth meshing with said gear teeth of said rail for enabling centering of said bolt lock hole mechanism.

10. The door lock set installation kit according to claim 7, wherein said locking mechanism comprising a plurality of ratchet teeth on one of said at least one rails and a ratchet arm coupled with said ratchet teeth for positioning said hole saw guides with respect to one another.

11. The door lock set installation kit according to claim 10 further including a latch securing said ratchet arm in position on said rail for locking said hole saw guides with respect to one another.

12. The door lock set installation kit according to claim 7, wherein each hole saw guide includes a pair of rails.

* * * * *